(12) United States Patent
Lau et al.

(10) Patent No.: US 7,253,989 B1
(45) Date of Patent: Aug. 7, 2007

(54) DISK DRIVE COMPENSATION OF BIAS IMPARTED BY A FLEX CIRCUIT CABLE UTILIZING A DUAL BIAS CURVE ESTIMATION SCHEME

(75) Inventors: Pui-Wah Lau, Huntington Beach, CA (US); Jenghung Chen, Cupertino, CA (US); Yanbin Song, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/086,814

(22) Filed: Mar. 21, 2005

(51) Int. Cl.
*G11B 5/596* (2006.01)

(52) U.S. Cl. .................................. 360/78.04

(58) Field of Classification Search ............. 360/75, 360/78.04, 78.06, 46, 66, 77.04, 67, 78.09, 360/97.01; 318/561
See application file for complete search history.

(56) References Cited

U.S. PATENT DOCUMENTS

| | | | | |
|---|---|---|---|---|
| 4,697,127 A | * | 9/1987 | Stich et al. | 318/561 |
| 5,150,266 A | * | 9/1992 | Albert | 360/78.04 |
| 5,369,345 A | * | 11/1994 | Phan et al. | 318/561 |
| 5,583,721 A | * | 12/1996 | Kim | 360/97.01 |
| 5,721,648 A | * | 2/1998 | Phan et al. | 360/78.09 |
| 5,774,291 A | * | 6/1998 | Contreras et al. | 360/67 |
| 5,872,674 A | | 2/1999 | Eddy | |
| 6,023,390 A | * | 2/2000 | Kang | 360/77.04 |
| 6,067,200 A | * | 5/2000 | Ohba et al. | 360/66 |
| 6,738,220 B1 | * | 5/2004 | Codilian | 360/78.04 |
| 6,847,501 B2 | * | 1/2005 | Cheung et al. | 360/46 |
| 6,995,944 B1 | * | 2/2006 | Takaishi et al. | 360/78.06 |
| 2005/0063098 A1 | * | 3/2005 | Matsumura et al. | 360/254.6 |
| 2005/0105207 A1 | * | 5/2005 | Park | 360/78.04 |

* cited by examiner

*Primary Examiner*—Fred F. Tzeng
(74) *Attorney, Agent, or Firm*—Blakely Sokoloff Taylor & Zafman (57) ABSTRACT

A disk drive comprising an actuator including a head, a disk, and a processor connected to the actuator by a flex circuit cable. The processor under the control of a program to: apply a control signal for a seek operation and to apply a bias signal to the control signal to approximate the bias imparted by the flex circuit cable. The bias is determined from a data structure that stores: bias values for track zones representative of a first and second bias curves that approximate a bias imparted by the flex circuit cable upon the actuator as the actuator moves the head from the OD to the ID of the disk and from the ID to the OD of the disk, respectively. The bias values representative of the first and second bias curves are determined based upon a non-linear apportionment of track zones.

18 Claims, 6 Drawing Sheets

DISK DRIVE COMPENSATION OF BIAS IMPARTED BY A FLEX CIRCUIT CABLE UTILIZING A DUAL BIAS CURVE ESTIMATION SCHEME

BACKGROUND OF THE INVENTION

1. Field of the Invention

The present invention relates to disk drives. More particularly, the present invention relates to a disk drive that compensates for the bias imparted by a flex circuit cable during a seek operation by utilizing a dual bias curve estimation scheme.

2. Description of the Prior Art and Related Information

Today, computers are routinely used both at work and in the home. Computers advantageously enable file sharing, the creation of electronic documents, the use of application specific software, and electronic commerce through Internet and other computer networks. Typically, each computer has a storage peripheral such as a disk drive (e.g. a hard disk drive).

A huge market exists for hard disk drives for mass-market computer systems such as servers, desktop computers, and laptop computers. To be competitive in this market, a hard disk drive should embody a design that is adapted for providing rapid access to data and providing high data storage capacity. Satisfying these competing constraints of rapid access to data and high data storage capacity requires innovation in many of the numerous components of the disk drive.

Typically, the main assemblies of a hard disk drive are a head disk assembly (HDA) and a printed circuit board assembly (PCBA). The head disk assembly includes an enclosure including a base and a cover, at least one disk having at least one recording surface, a spindle motor for causing each disk to rotate, and an actuator arrangement. The PCBA generally includes circuitry for processing signals and controlling operations in the disk drive.

An actuator arrangement that is commonly used in hard disk drives is a rotary actuator arrangement included as part of a head stack assembly (HSA) that includes a collection of elements of the head disk assembly. The collection typically includes certain prefabricated subassemblies and certain components that are incorporated into the head disk assembly. For example, a prefabricated head stack assembly (HSA) may include a pivot bearing cartridge, a rotary actuator arrangement, and permanent magnets and an arrangement for supporting the magnets to produce a magnetic field for a voice coil motor.

The rotary actuator arrangement of the HSA may also include a coil forming another part of the voice coil motor, an actuator body having a bore through it, and a plurality of arms projecting parallel to each other and perpendicular to the access of the bore. The rotary actuator arrangement of the HSA may also include head gimbal assemblies (HGAs) that are supported by the arms. Each HGA includes a load beam and a head supported by the load beam. The head is positioned over a track on a recording surface of the disk to write or read data to or from the track, respectively. A flex circuit cable typically connects the processing circuitry of the PCBA to the rotary actuator of the HSA in order to deliver commands such as read and write commands, as well as seeking and tracking commands.

Because of the competitive pressure to continually develop hard disk drives that provide faster and more robust access to data, techniques are continuously being developed to decrease the access time to data. One technique to accomplish this is by increasing the speed and accuracy by which the HSA is pivoted to position the head over a track of the disk in order to access data as part of a seek operation. Particularly, in order to provide faster access to data, techniques are continually being developed to decrease seek time to data.

Seek time generally refers to the time required to move the head of the actuator from a current position or current track to a target position or target track. The seek time is determined by the mechanical characteristics of the HSA and by a seek profile. The seek profile defines, during the time that the actuator is accelerated and decelerated en-route to the target track, a desired acceleration/deceleration profile and desired velocity profile to achieve an efficient and predictable arrival of the head to the target track of the disk. Disk drive makers work diligently to improve the efficiency and accuracy of the seek operation.

One common problem associated with seek operations is that the flex circuit cable typically imparts a bias force upon the actuator that needs to be accounted for in the final control effort to cancel its effect. If the bias imparted by the flex circuit cable is not properly accounted for in the control effort of the seek operation, the seek operation performs poorly resulting in decreased data retrieval time and overall degraded throughput performance.

Particularly, the flex circuit cable typically imparts a spring action that operates upon the actuator as a bias force. Also, other factors affect the bias of the flex circuit cable on the actuator such as windage on the flex circuit cable and actuator, the internal ambient temperature of the disk drive, as well as other factors.

Previous attempts have been made to address flex circuit cable bias in seek operations. For example, U.S. Pat. No. 5,872,674 issued to Eddy discloses a specialized seek controller and tracking controller to attempt to account for various biases. The tracking controller of Eddy is preferably implemented as a digital signal processor (DSP) and includes a proportional integrator differentiator (PID) controller. In conjunction with the DSP tracking controller, Eddy discloses the use of a look-up table that is provided to store predicted bias values and locations addressable by seek direction, previous seek direction, seek length, and head position.

Other more robust techniques have been implemented in modern microprocessor-based disk drives to attempt to compensate for bias forces imparted by the flex circuit cable during seek operations, such as, by storing bias values representative of a single bias curve that is used to estimate bias effects. Unfortunately, these techniques do not provide the desired degree of accuracy for high performance disk drives that have an ever-increasing radial density of data tracks.

SUMMARY OF THE INVENTION

The present invention relates to a disk drive that compensates for the bias imparted by a flex circuit cable during a seek operation by utilizing a dual bias curve estimation scheme.

In one aspect, the invention may be regarded as a disk drive comprising an actuator including a head, a disk having an outer diameter (OD) and an inner diameter (ID) and a plurality of tracks therebetween and in which the disk is divided into a plurality of track zones each having a plurality of tracks, and a processor for controlling operations in the disk drive including a seek operation from a first track to a second track in which the head is moved between the first track and the second track by movement of the actuator. The processor may be connected to the actuator by a flex circuit cable.

The processor under the control of a program applies a control signal for the seek operation to command the actuator to move the head from the first track to the second track and applies a bias signal to the control signal to approximate the bias imparted by the flex circuit cable. The bias is determined from a data structure. The data structure stores: bias values for each of the track zones representative of a first bias curve to approximate a bias imparted by the flex circuit cable upon the actuator as the actuator moves the head from the OD to the ID; and bias values for each of the track zones representative of a second bias curve to approximate a bias imparted by the flex circuit cable on the actuator as the actuator moves the head from the ID to the OD. The bias values representative of the first and second bias curves are determined based upon a non-linear apportionment of track zones.

In one embodiment, the non-linear apportionment of track zones includes a substantially greater number of track zones being apportioned towards the OD of the disk. In another embodiment, the non-linear apportionment of track zones may include a substantially greater number of track zones being apportioned towards the ID of the disk. In a further embodiment, the non-linear apportionment of track zones includes a substantially greater number of track zones being apportioned towards the ID of the disk and the OD of the disk and a lesser number of track zones being apportioned to a middle section of the disk.

In one embodiment, the bias values representative of the first and second bias curves are initially determined during the calibration of the disk drive. The bias values representative of the first and second bias curves may be determined during the calibration of the disk drive and may be stored in the data structure on the disk of the disk drive. During power-up of the disk drive, offset values from the determined bias values representative of the first and second bias curves may be calculated. These offset values may be stored in memory and adapted during seeking. Further, in one embodiment, the data structure may be a look-up table.

In another aspect, the invention may be regarded as a method to implement a seek operation in a disk drive to move a head of an actuator from a first track to a second track in which the method includes compensating for the bias imparted by a flex circuit cable upon the actuator. The method comprises applying a control signal for the seek operation to command the actuator to move the head from the first track to the second track and to apply a bias signal to the control signal to approximate the bias imparted by the flex circuit cable. The bias may be determined from a data structure.

The data structure may store bias values for each of a plurality of track zones representative of a first bias curve to approximate a bias imparted by the flex circuit cable upon the actuator as the actuator moves the head from the outer diameter (OD) to the inner diameter (ID) of the disk. The data structure may further store bias values for each of a plurality of track zones representative of a second bias curve to approximate a bias imparted by the flex circuit cable upon the actuator as the actuator moves the head from the ID to the OD of the disk. The bias values representative of the first and second bias curves may be determined based upon a non-linear apportionment of track zones.

The foregoing and other features of the invention are described in detail in the Detailed Description and are set forth in the appended claims.

DETAILED DESCRIPTION

Figure 1:
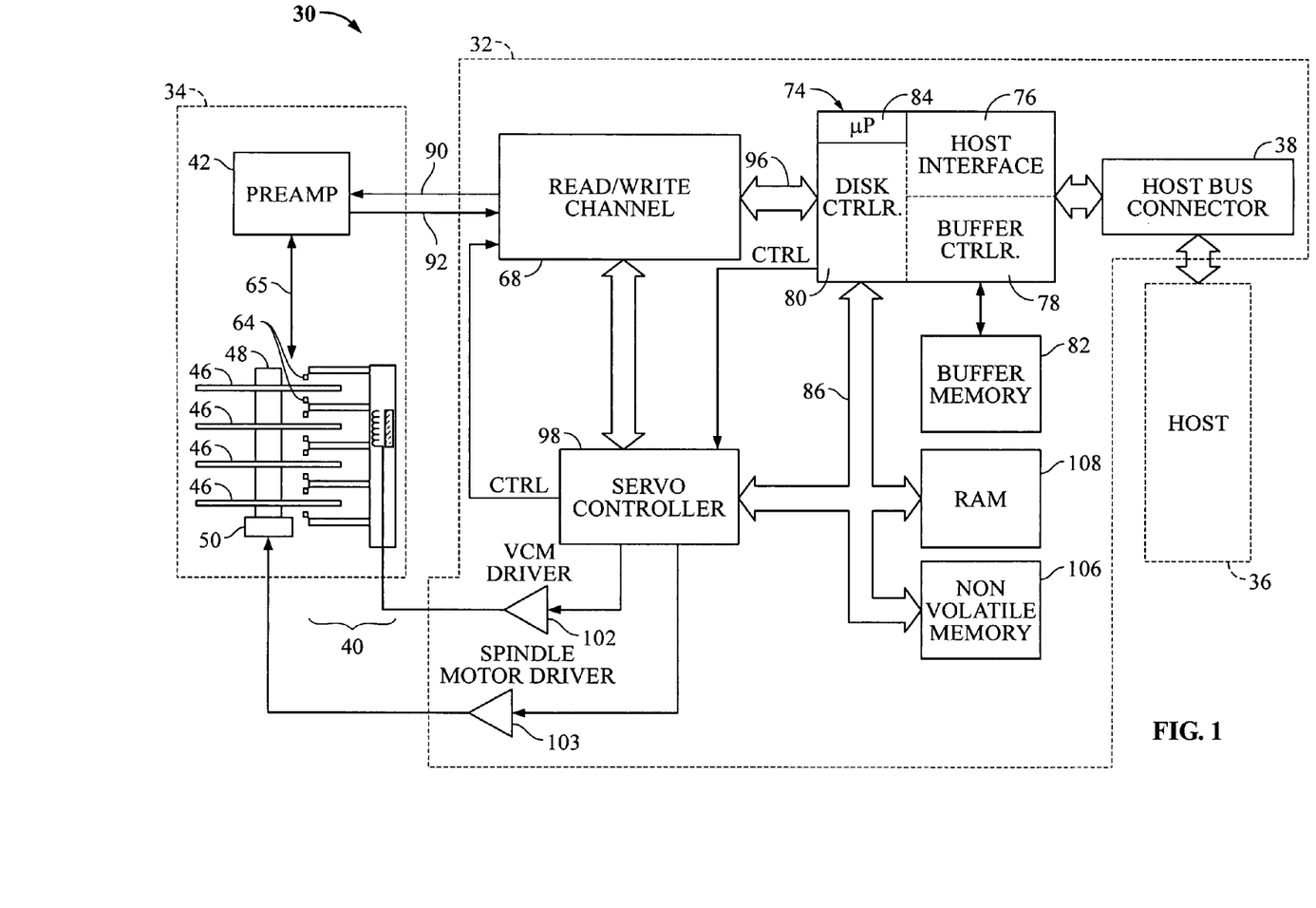
FIG. 1 shows a block diagram of a disk drive, such as a hard disk drive.

FIG. 1 shows a block diagram of a disk drive, such as a hard disk drive 30, in which embodiments of the invention may be practiced. The disk drive 30 may be connected to a host computer 36. Disk drive 30 comprises a Head/Disk Assembly (HDA) 34 and a controller printed circuit board assembly, PCBA 32.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques.

HIDC 74 comprises a disk controller 80 for formatting and providing error detection and correction of disk data and other disk drive operations, a host interface controller 76 for responding to commands from host 36, a buffer controller 78 for storing data which is transferred between disks 46 and host 36, and microprocessor 84. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

Disk drive 30 may employ a sampled servo system in which equally spaced servo wedge sectors are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

Typically, the servo controller 98 moves the head 64 toward a desired track during a coarse "seek" mode using a track ID field as a control input and thereafter implements a "track follow" mode after the head has settled to the track. Servo sectors are continuously received by channel 68, and are processed by servo controller 98 to provide position information to microprocessor 84 via bus 86.

As is well known in the art, based upon position error signals (PESs) calculated by the servo controller representative of the error between the desired position of the head and the actual position of the head, servo control signals are adapted to move the head to the desired position or to keep the head at the desired position. The head generally reads the servo sectors to produce a position error signal (PES) that is zero when the head is at a particular radial position. In this way, the servo controller implements a servo control loop for controlling the position of the head to perform track following on the plurality of servo sectors of the track.

Figure 2:
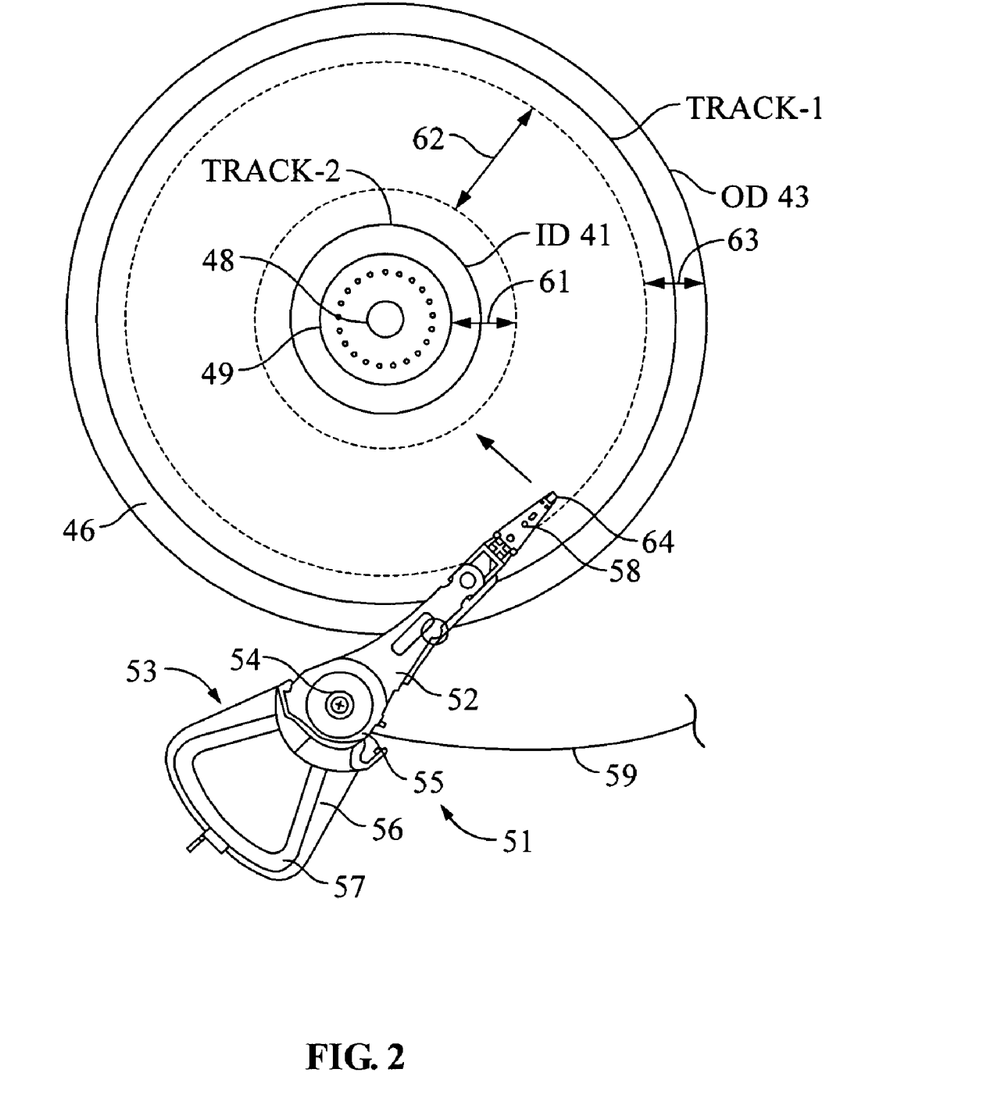
FIG. 2 is an example of an actuator having a flex circuit cable attached thereto and a disk.

With reference also to FIG. 2, FIG. 2 is an example of an actuator having a flex circuit cable attached thereto and a disk. As shown in FIG. 2, a rotary actuator 51 is shown relative to a disk 46 for pivoting the head 64 of the rotary actuator 51 about the disk to perform seek operations and read/write operations, etc.

As previously discussed, disk 46 may be mounted within the disk drive on a spindle 48 utilizing a disk clamp 49 for rapid rotation within the disk drive. The rotary actuator 51 in turn moves head 64 over the disk 46.

The rotary actuator 51 may be part of a head stack assembly (HSA) of the HDA 34. It should be appreciated that HSAs and rotary actuators are well known in the art, and this is but one example.

Looking at this particular example, rotary actuator 51 may include a head gimbal assembly (HGA) 58 to which a head 64 is mounted, a body portion 55 having a pivot bore for receipt of a pivot bearing cartridge 54, at least one actuator arm 52 cantilevered from the body portion 55, and a coil assembly 53 cantilevered from the body portion 55 in an opposite direction from the actuator arm 52. The actuator arm 52 supports HGA 58 that supports head 64 for writing and reading data to and from the disk 46, respectively. For example, the head can include an inductive head that is used to both read and write data on a recording surface of the disk 46, or a magnetoresistance (MR) head, which includes a MR head element to read data and an inductive element to write data.

The flex circuit cable 59 connects the processing circuitry of the PCBA 32 to the rotary actuator 51 of the HSA in order to deliver commands such as read and write commands, as well as seeking and tracking commands.

The coil assembly 53 includes a coil 57 and a fork 56. The fork 56 cantilevered from the body portion 55 in an opposite direction from the actuator arm 52 and mounts the coil 57. The rotary actuator 51 is pivotly secured to the base of the disk drive via the pivot bearing cartridge 54 mounted through the pivot bore of the body portion 55 of the rotary actuator arm 51. In this way, the head 64 at the distal arm of the HGA 58 may be moved over a recording surface of the disk 46. It should be appreciated that the rotary actuator 51 may include a vertical stack of HGAs supported by multiple actuator arms for use with multiple vertically stacked disks 46.

Further, as previously discussed with reference to FIG. 1, a voice coil motor may be utilized with rotary actuator 51 in order to precisely position actuator 51 under the control of servo controller. In one example, the VCM may include one or more VCM plates which each include a permanent magnet. The coil 57 of the rotary actuator 51 may be disposed between the top and bottom VCM plates in order to form a voice coil motor to cause the pivoting of the actuator 51 about the pivot axis defined by the pivot bearing cartridge 54 by inputting current into the coil 57. Thus, the voice coil motor can be used to controllably position the head 64 of the actuator 51 relative to the disk for writing and/or reading data. However, it should be appreciated that many other types of actuators and positioning means for the actuator may be utilized in accordance within embodiments of the invention, and this is just one example.

Looking particularly at disk 46, disk 46 includes an outer diameter (OD) 43 and an inner diameter (ID) 41. As is known, tracks of the disk may be grouped into outer diameter tracks (indicated by arrow 63) proximate to the OD 43, inner diameter tracks (indicated by arrow 61) proximate the ID 41, and middle diameter tracks (indicated by arrow 62) between the OD and ID tracks. It should be noted that these types of groupings are merely for ease of reference.

As shown in FIG. 2, actuator 51 may be commanded to move the head 64 from a first track (track-1) to a second track (track-2) during a seek operation.

However, a common problem associated with seek operations is that the flex circuit cable 59 imparts a bias upon the actuator 51, and if not properly accounted for during the seek operation, results in a seek operation that performs poorly. This results in decreased data retrieval time and overall degraded throughput performance. Particularly, the flex circuit cable 59 imparts a spring action that operates upon the actuator 51 as a bias force.

According to embodiments of the invention, the microprocessor 84 may operate under the control of a program or routine to execute methods or processes in accordance with embodiments of the invention related to compensating for the bias imparted by the flex circuit cable during a seek operation by utilizing a dual bias curve estimation scheme. For example, such a program may be implemented in software or firmware (e.g. stored in non-volatile memory 106 or other locations) and may be implemented by microprocessor 84.

As previously discussed, microprocessor 84 controls operations in the disk drive 30 including seek operations from a first track to a second track in which the head 64 is moved between the first track and the second track by movement of the actuator 51. The microprocessor 84 is connected to the actuator 51 by the flex circuit cable 59. As will be discussed in more detail later, the tracks of disk 46 may be divided into a plurality of track zones to aid in the process to be described hereinafter.

Figure 3:
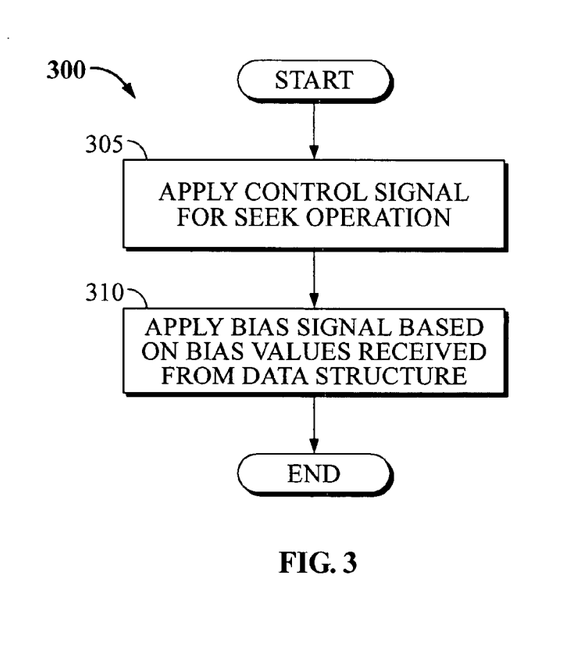
FIG. 3 is a flow diagram illustrating the application of a bias signal to a control signal of a seek operation.

With reference also to flow diagram 300 of FIG. 3, the microprocessor 84 under the control of a program may apply a control signal to the seek operation (block 305) to command the actuator 51 to move the head 64 from the first track to the second track. Next, the microprocessor under the control of the program may apply a bias signal to the control signal to approximate the bias imparted by the flex circuit cable 59, in which the bias is determined from bias values received from a data structure (block 310).

As will be discussed, the data structure stores bias values for each of a plurality track zones representative of a first bias curve to approximate a bias imparted by the flex circuit cable upon the actuator as the actuator moves the head from the OD to the ID of the disk and bias values for each of a plurality track zones representative of a second bias curve to approximate a bias imparted by the flex circuit cable upon the actuator as the actuator moves the head from the ID to the OD of the disk. In one embodiment, the bias values representative of the first and second bias curves are determined based upon a non-linear apportionment of track zones.

Figure 4:
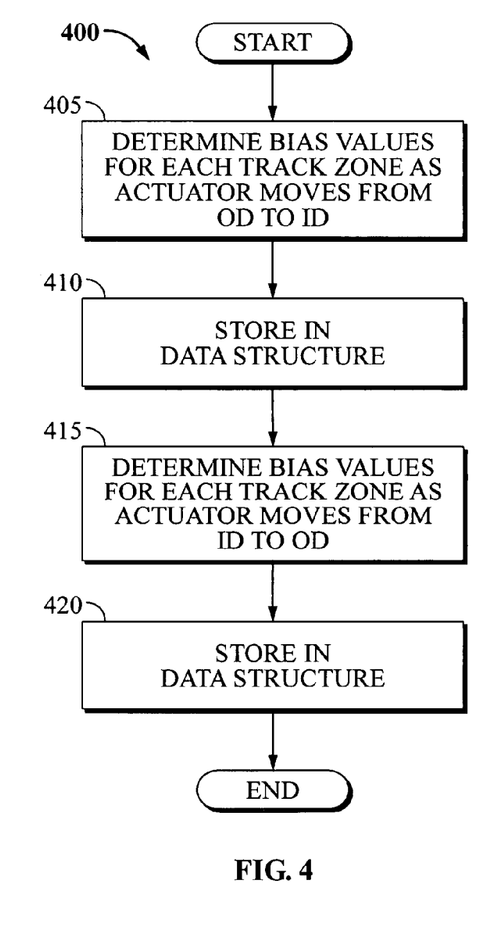
FIG. 4 is a flow diagram illustrating the determination of bias values during the calibration of the disk drive that are stored in a data structure.

With reference to FIG. 4, FIG. 4 is a flow diagram 400 illustrating an example of determining bias values that can be used for first and second bias curves that are determined during the calibration of the disk drive. These bias values may be stored in a data structure on the disk of the disk drive itself. The calibration is typically performed during the manufacture of the disk drive before it is sent out to distributors, customers, etc.

With reference to both FIG. 4 and FIG. 2, the process 400 first determines bias values for each track zone of the disk 46 as the actuator 51 is moved from the OD 43 to the ID 41 of the disk (block 405). These bias values are then stored in a data structure (block 410).

It should be noted that disk 46 may be divided into any suitable number of track zones. For example, disk may be divided into 32 track zones. Further, the track zones may be non-linearly apportioned. For example, a substantially greater number of track zones may be apportioned towards the OD of the disk. Conversely, a substantially greater number of track zones may be apportioned towards the ID of the disk. Alternatively, a substantially greater number of track zones may be apportioned towards the ID of the disk and the OD of the disk and a lesser number of track zones may be apportioned to the middle section of the disk. In another embodiment, a greater number of track zones may be apportioned to the middle section of the disk and a lesser number of track zones may be apportioned towards the ID and the OD of the disk. It should be appreciated that any combination of nonlinear and/or linear apportionment of track zones between ID, OD, and middle sections of the disk may be utilized in order to best characterize the bias of the flex circuit cable as the actuator is moved relative to the disk.

Continuing with calibration process 400, next, bias values for each of the track zones are then determined as the actuator 51 is moved from the ID 41 to the OD 43 of the disk 46 (Block 415). These bias values are then also stored in the data structure (block 420).

Figure 5:
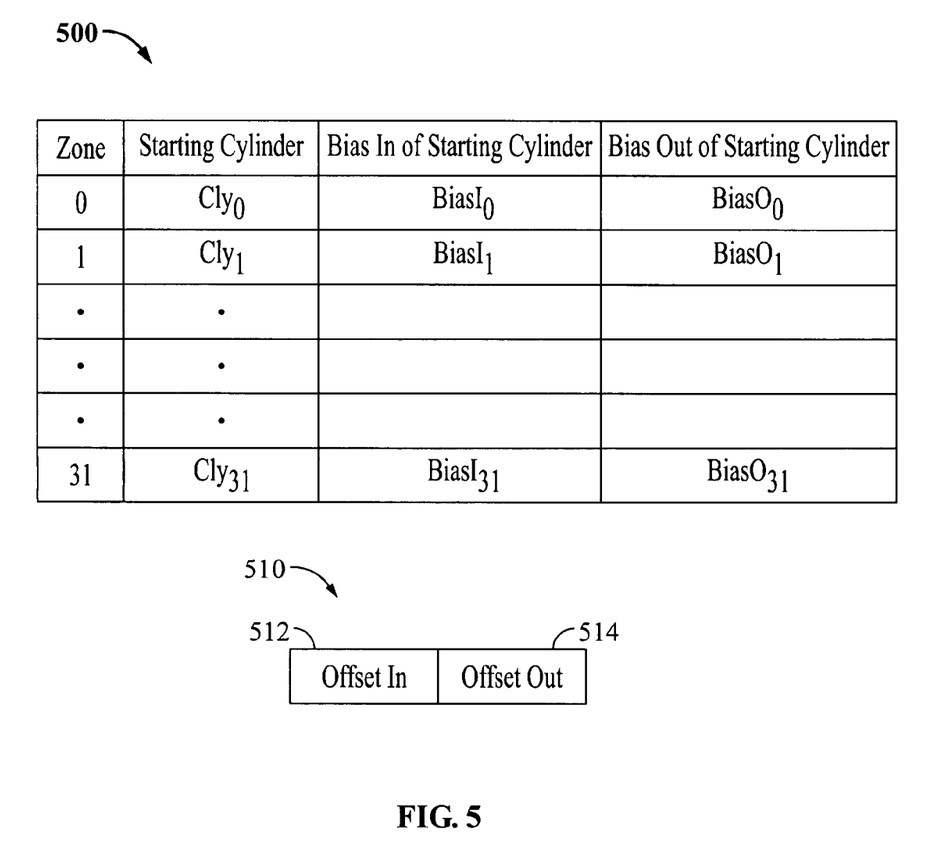
FIG. 5 is a diagram illustrating an example of a data structure to store the bias values.

Turning now to FIG. 5, FIG. 5 provides an example of a data structure 500 to store the bias values for each of the track zones. In one embodiment, the data structure 500 can be in the form of a look-up table.

As shown in FIG. 5, all of the bias values for the track zones, after calibration of the disk drive, may be stored and saved to a disk for subsequent use upon power-up of the disk drive. As shown in FIG. 5, the data structure 500 stores, for each track zone, a plurality of different values. In this example, the disk has been divided into 32 different track zones (e.g. zone 0 . . . zone 31) (first column). It should be noted that hereinafter the term cylinder will be used interchangeably with the term track and will have the same meaning.

Particularly, looking at data structure 500, the first column is the index of the data structure based on track zones. The second column of data structure 500 is the starting cylinder of each track zone ($Cyl_0 \ldots Cyl_{31}$). The starting cylinder of each track zone may be selectable to optimize the bias curve for a particular disk drive. The third column stores the bias value calculated at the starting cylinder of each track zone as the actuator is moved from ID to OD during calibration. The fourth column stores the bias value calculated at the starting cylinder of each track zone as the actuator is moved from the OD to the ID during calibration.

It should be noted that these bias values that are stored in data structure 500 are determined during the calibration of the disk drive before it is sent out to distributors, customers, etc. Further, the measurement of bias forces imparted by a flex circuit cable upon an actuator may be accomplished by well-known methods. Additionally, the track zones may be non-linearly apportioned to better account and model the bias forces of the flex circuit cable upon the actuator based upon different types of disk drives. For example, track zones may be non-linearly apportioned by apportioning a greater number of track zones towards the OD of the disk or towards the ID of the disk, or towards both the OD and the ID of the disk with fewer track zones being apportioned in the middle portion of the disk.

During the power-up of the disk drive, the data structure 500 is read from the disk into the memory of the disk drive. The data structure 500 is utilized to determine bias values that are used as the basis for the bias signal that is applied to the control signal of the servo controller to approximate the bias imparted by the flex circuit cable. The bias values from the data structure 500 may be utilized upon the first seek after power-up, as well as subsequent seeks, in conjunction with offset values that are continuously updated and adapted for each seek operation.

Figure 6:
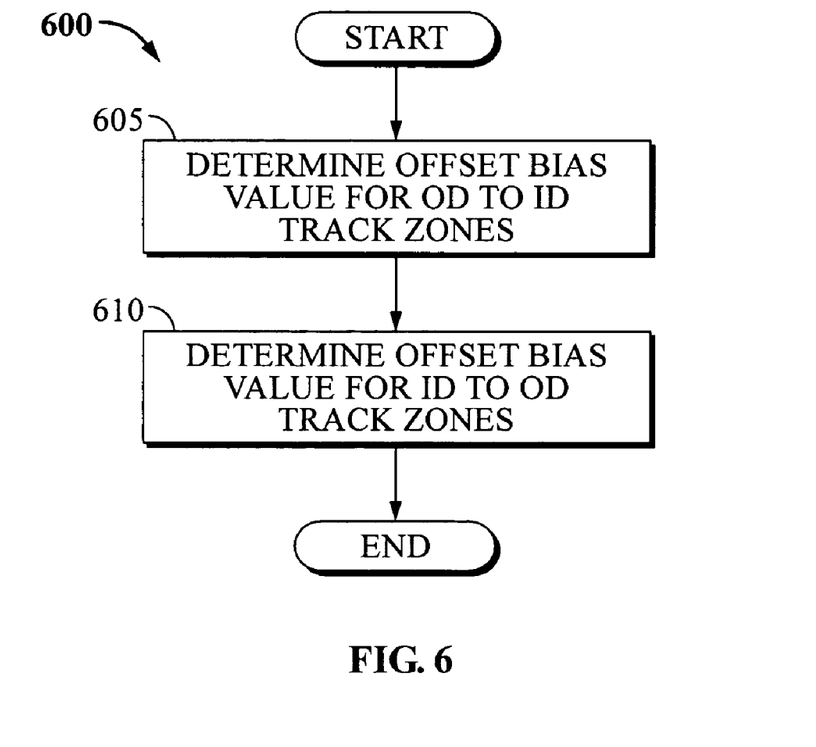
FIG. 6 is a flow diagram illustrating the determination of offset values.

As shown in FIG. 6, an offset bias value is determined for OD to ID track zones (block 605) and for ID to OD track zones (block 610). These may be stored in a table in memory. For example, with reference to FIG. 5, they may be stored in table 510 as Offset In 512 and Offset Out 514, respectively.

Particularly, the offset values are based on an actual measured bias force versus the estimated bias force from the data structure 500. During operations, after power-up, the servo controller during seeking and track-follow mode, based on PES values, can determine the actual bias force of the flex circuit cable by well-known methods. Based upon this, an offset value from the estimated bias force value from the data structure 500 can be calculated and stored. This can be done for both ID to OD seeks and OD to ID seeks.

Utilizing the initial bias estimate values (ID to OD and OD to ID) from the data structure 500, the subsequently determined offset values (both ID to OD and OD to ID), as well as linear interpolation, bias force values from the flex circuit cable upon the actuator during seek operations can be calculated with a very high degree of accuracy. This accuracy is even further increased due to the non-linear apportionment of the track zones.

In one embodiment, the bias of the flex circuit cable may be governed by the following equations:

$$\text{Bias\_in} = \text{Bias}I_n + (\text{Cyl} - \text{Cyl}_n) * (\text{Bias}I_{n+1} - \text{Bias}I_n) * C_n / 2^{20} + \text{FlxOfst}I$$

$$\text{Bias\_out} = \text{Bias}O_n + (\text{Cyl} - \text{Cyl}_n) * (\text{Bias}O_{n+1} - \text{Bias}O_n)$$
$$* C_n / 2^{20} + \text{FlxOfst}O$$

These linear interpolation equations can be utilized in conjunction with the data structure 500, and the determined offset values, to accurately estimate a bias value that can be utilized as part of a bias signal, which is applied to the control signal during a seek operation, to accurately approximate the bias imparted by the flex circuit cable and compensate for it. Looking now at each of the equations, each of the terms will be discussed.

Looking at the Bias_in equation, $\text{BiasI}_n$ denotes the bias of the flex circuit cable (going from ID to OD) associated with a starting cylinder ($\text{Cyl}_n$) of the track zone. Cyl denotes the cylinder that the head is currently at. $\text{Cyl}_n$ denotes the starting cylinder of the track zone for the cylinder (Cyl) at which the head is currently at. $\text{BiasI}_{n+1}$ denotes the bias value of the flex circuit cable associated with the cylinder $\text{Cyl}_{n+1}$ at the end of the current track zone and the beginning of the next track zone. $C_n/2^{20}$ denotes a scaling factor. This scaling factor may be changed dependent upon the number of tracks/cylinders and the apportionment of track zones and upon the mechanical characteristics of the disk drive for which the bias of the flex circuit cable is being characterized. FlxOfstI denotes the offset value for the flex circuit cable going from ID to OD.

Looking at the Bias_out equation $\text{Bias} O_n$ denotes the bias of the flex circuit cable (going from OD to ID) associated with a starting cylinder ($\text{Cyl}_n$) of the track zone. Cyl denotes the cylinder that the head is currently at. $\text{Bias} O_{n+1}$ denotes the bias value of the flex circuit cable associated with the $\text{Cyl}_{n+1}$ at the end of the current track zone and the beginning of the next track zone. FlxOfstO denotes the offset value of the flex circuit cable going from OD to ID.

With these equations, as will be discussed in the following example, the bias value for a cylinder (Cyl) that the head is currently at can be linearly interpolated with a high degree of accuracy.

Figure 7:
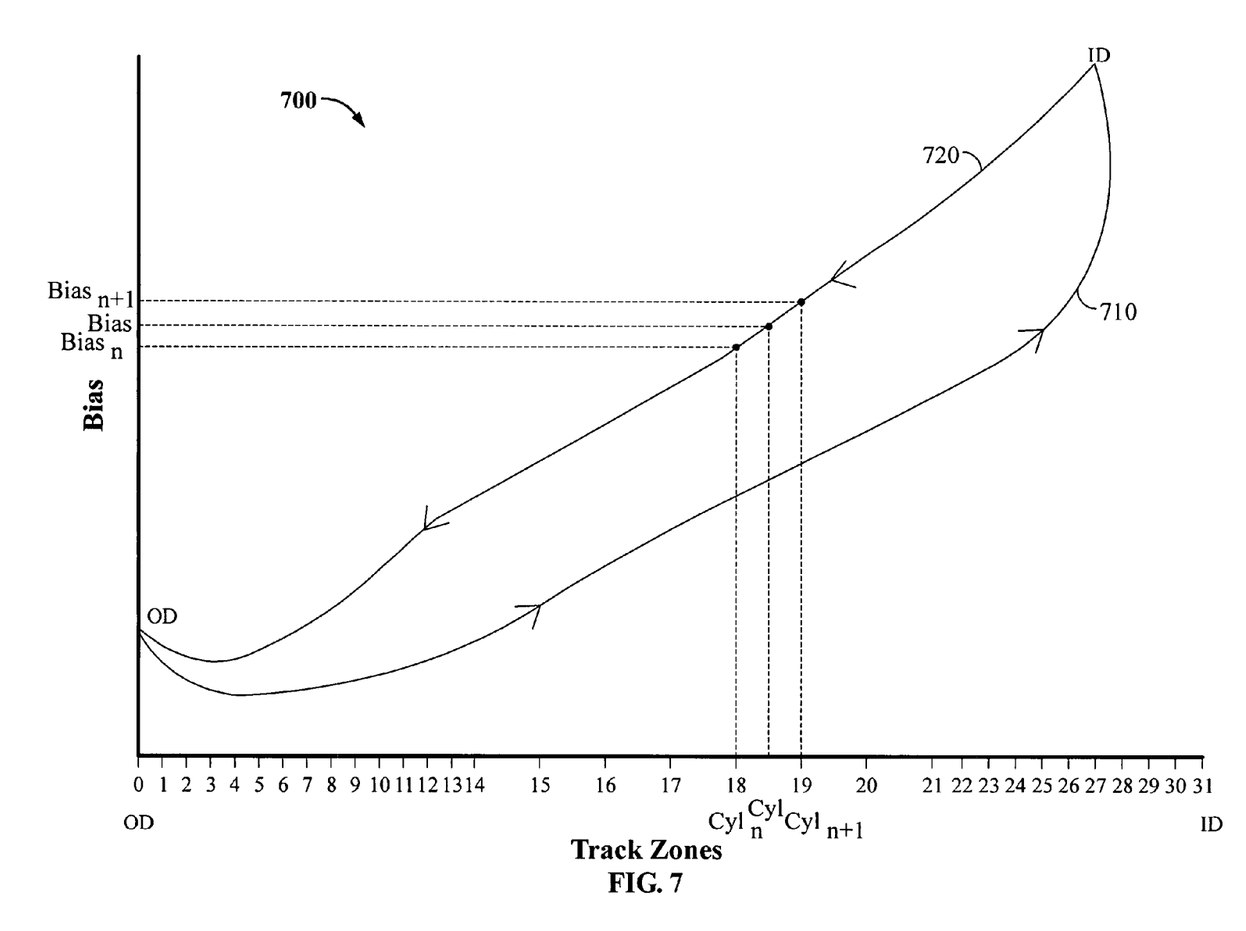
FIG. 7 is a diagram illustrating a dual bias curve that can be utilized for the estimation of bias forces imparted by a flex circuit cable.

With reference now to FIG. 7, FIG. 7 is a diagram illustrating a dual bias curve that can be utilized for the estimation of bias forces imparted by a flex circuit cable. The graph in FIG. 7 illustrates bias forces imparted by a flex circuit cable versus track zones. As can be seen, the track zones are non-linearly apportioned. Particularly, there are substantially greater number of track zones being apportioned towards the OD of the disk (1–14) and the ID of the disk (21–31) and a lesser number of track zones (15–20) being apportioned in the middle section of the disk.

Particularly, estimation curve 720 is a representation of the bias values going from the ID to the OD of the disk as determined and stored in data structure 500. Similarly, estimation curve 710 represents the bias values going from the OD towards the ID of the disk as stored in data structure 500. Utilizing this dual bias curve estimation scheme the bias force imparted by the flex circuit cable can be very accurately estimated. FIG. 7 provides a graph-based example.

Thus, utilizing ID to OD bias curve 720 in conjunction with the previously discussed linear interpolation equation Bias_in, and the bias values of the data structure 500 upon which the curve is based, a bias value (Bias_in) of the flex circuit cable can be accurately estimated for the cylinder (Cyl) that the head is currently at.

For example, assume a cylinder (Cyl) in track zone 18 is where the head is currently located. As shown in the graph, $\text{Bias}_n$ denotes the bias value of the starting cylinder ($\text{Cyl}_n$) for the track zone as shown on bias curve 720 and stored in the data structure table. The following track zone 19 starting with $\text{Cyl}_{n+1}$ is shown having bias value ($\text{Bias}_{n+1}$) shown on the bias estimation curve 720 and stored in the data structure.

The bias value for the cylinder (Cyl) at which the head is currently located can be determined by the linear interpolation equation for Bias_in (previously discussed), optionally including determined flex offset value (FlxOfstI), as particularly illustrated in FIG. 7.

It should be appreciated that with these equations and the use of the dual bias curves 710 and 720 that have been previously determined during the calibration process, and continuously updated thereafter with offset values, that bias values for the flex circuit cable can be very accurately estimated for improved and more accurate estimation and seeking processes. Because the bias tables and bias curves 710 and 720 are separated for ID to OD seeks and OD to ID seeks, the non-linear effects associated with flex circuit cable bias and hysterisis can be more accurately estimated. Particularly, because the middle diameter of the disk is typically more linear, fewer track zones can be allocated for the middle diameter of the disk while still accurately estimating the bias force associated with the flex circuit cable for the middle diameter of the disk. Conversely, a greater number of track zones can be a non-linearly apportioned to the OD and the ID regions of the disk where the flex circuit cable operates in a more non-linear fashion.

Further, the offset values for both OD and ID seeks and ID to OD seeks, since they are continuously updated upon each successive seek operations, can more accurately accommodate temperature variations within the disk drive which also affects the bias force imparted by the flex circuit cable. The offset values, by being successively updated, also accommodate bias force changes associated with the flex circuit cable over time. Additionally, the use of non-linear track zone partitioning provides an easily configurable way to estimate the biases of different types of flex circuit cables for different types of disk drives.

While embodiments of the present invention and its various functional components have been described in particular embodiments, it should be appreciated that the embodiments can be implemented in hardware, software, firmware, or combinations thereof.

We claim:

1. A disk drive comprising:
    an actuator including a head;
    a disk having an outer diameter (OD) and an inner diameter (ID) and a plurality of tracks therebetween, the disk being divided into a plurality of track zones each having a plurality of tracks; and
    a processor for controlling operations in the disk drive including a seek operation from a first track to a second track in which the head is moved between the first track and the second track by movement of the actuator, the processor being connected to the actuator by a flex circuit cable, the processor under the control of a program to:
        apply a control signal for the seek operation to command the actuator to move the head from the first track to the second track;
        apply a bias signal to the control signal to approximate the bias imparted by the flex circuit cable, the bias being determined from a data structure, the data structure storing:
            bias values for each of the track zones representative of a first bias curve to approximate a bias imparted by the flex circuit cable upon the actuator as the actuator moves the head from the OD to the ID; and bias values for each of the track zones representative of a second bias curve to approximate a bias imparted by the flex circuit cable upon the actuator as the actuator moves the head from the ID to the OD;

wherein the bias values representative of the first and second bias curves are determined based upon a non-linear apportionment of track zones.

2. The disk drive of claim 1, wherein the non-linear apportionment of track zones includes a substantially greater number of track zones being apportioned towards the OD of the disk.

3. The disk drive of claim 1, wherein the non-linear apportionment of track zones includes a substantially greater number of track zones being apportioned towards the ID of the disk.

4. The disk drive of claim 1, wherein the non-linear apportionment of track zones includes a substantially greater number of track zones being apportioned towards the ID of the disk and the OD of the disk and a lesser number of track zones being apportioned to a middle diameter section of the disk.

5. The disk drive of claim 1, wherein the bias values representative of the first and second bias curves are initially determined during the calibration of the disk drive.

6. The disk drive of claim 5, wherein the bias values representative of the first and second bias curves are determined during the calibration of the disk drive and are stored in the data structure on the disk of the disk drive.

7. The disk drive of claim 5, wherein during power-up of the disk drive, offset values from the determined bias values representative of the first and second bias curves are calculated.

8. The disk drive of claim 7, wherein the offset values are stored in memory and are adapted during seeking.

9. The disk drive of claim 1, wherein the data structure is a look-up table.

10. In a disk drive including a disk having an outer diameter (OD) and an inner diameter (ID) and a plurality of tracks therebetween in which the disk is divided into a plurality of track zones, the disk drive including an actuator having a head, the actuator being connected to processing circuitry of the disk drive by a flex circuit cable, a method to implement a seek operation to move the head from a first track to a second track that includes compensating for the bias imparted by the flex circuit cable comprising:

applying a control signal for the seek operation to command the actuator to move the head from the first track to the second track; and applying a bias signal to the control signal to approximate the bias imparted by the flex circuit cable, the bias being determined from a data structure, the data structure storing:

bias values for each of the track zones representative of a first bias curve to approximate a bias imparted by the flex circuit cable upon the actuator as the actuator moves the head from the OD to the ID; and bias values for each of the track zones representative of a second bias curve to approximate a bias imparted by the flex circuit cable upon the actuator as the actuator moves the head from the ID to the OD;

wherein the bias values representative of the first and second bias curves are determined based upon a non-linear apportionment of track zones.

11. The method of claim 10, wherein the non-linear apportionment of track zones includes a substantially greater number of track zones being apportioned towards the OD of the disk.

12. The method of claim 10, wherein the non-linear apportionment of track zones includes a substantially greater number of track zones being apportioned towards the ID of the disk.

13. The method of claim 10, wherein the non-linear apportionment of track zones includes a substantially greater number of track zones being apportioned towards the ID of the disk and the OD of the disk and a lesser number of track zones being apportioned to a middle diameter section of the disk.

14. The method of claim 10, wherein the bias values representative of the first and second bias curves are initially determined during calibration of the disk drive.

15. The method of claim 14, wherein the bias values representative of the first and second bias curves determined during calibration of the disk drive are stored in the data structure on the disk of the disk drive.

16. The method of claim 14, wherein during power-up of the disk drive, offset values from the initially determined bias values representative of the first and second bias curves are calculated.

17. The method of claim 16, wherein the offset values are stored in memory and are adapted during seeking.

18. The method of claim 10, wherein the data structure is a look-up table.

* * * * *